3,849,376
AROMATIC POLYAMIDE COMPOSITIONS CONTAINING AROMATIC DISULFIMIDE COMPOUND HAVING AN AFFINITY FOR BASIC DYES

Gerhard Dieter Wolf, Dormagen, Gunter Blankenstein, Stommeln, and Gunther Nischk, Dormagen, Germany, assignors to Bayer Aktiengesellschaft, Leverkusen, Germany
No Drawing. Continuation-in-part of application Ser. No. 161,285, July 9, 1971. This application Aug. 7, 1973, Ser. No. 386,272
Claims priority, application Germany, July 11, 1970, P 20 34 477.8
Int. Cl. C08g 20/38, 33/02
U.S. Cl. 260—47 CZ
6 Claims

ABSTRACT OF THE DISCLOSURE

Polyamide compositions comprising an aromatic polyamide and an aromatic disulphonimide compound. The polyamide compositions are useful for the production of readily basic dyeable fibers.

---

This invention is a continuation-in-part of U.S. Ser. No. 161,285, filed July 9, 1971.

This invention relates to fully aromatic or aromatic heterocycle-containing polyamide compositions which show a high affinity for basic dyes, and to a process for their production.

The polyamides which can be obtained by interfacial polycondensation, or by polycondensation in solution, from fully aromatic or aromatic heterocycle-containing diamines and aromatic dicarboxylic acid dihalides usually show no affinity for basic dyes. In order to enable basic dyes to be used for dyeing aromatic polyamides of this kind, processes have been developed for providing the polyamides with the requisite affinity for these dyes by incorporating acid groups. Thus, it is known that the dye absorption of aromatic polyamides can be improved by the addition of co-condensible carboxylic acid derivatives (U.S. Patent Specification No. 3,380,969) or by the addition of co-condensible sulphonic acid derivatives (Dutch Patent Specification No. 6717240). The addition of co-condensible compounds containing disulphimide structures to aromatic polyamides has also been proposed with the same objective in view.

In the context of the present invention, aromatic polyamides include both fully aromatic and also heterocycle-containing aromatic polyamides.

As high-temperature-resistant polymers, these aromatic polyamides must satisfy stringent requirements in regard both to tensile strength and to thermal stability. If, however, diamines containing acid groups, for example, are co-condensed in a concentration of from 5 to 10 mol percent (based on the total quantity of diamine), every tenth to twentieth diamine chain member of the original aromatic polyamide chain is replaced in random distribution by a diamine containing an acid group. The result of this is that, although the affinity for dyes of copolyamides of this kind is greatly increased compared with that of unmodified homopolyamides, the strength and thermal stability properties of these copolyamides are considerably reduced.

It has also been proposed to add to the polyamides, in order to improve their affinity for dyes, from 3 to 30% by weight of a copolyamide highly enriched with disulphimide groups or of a polyamide containing disulphimide groups. In this way, both the mechanical properties and the thermal properties are more effectively preserved because the fundamental structure of the aromatic homopolyamides is not changed.

It is an object of this invention to provide aromatic polyamide compositions having a high affinity for basic dyes coupled with considerably improved mechanical and thermal properties can be obtained by adding aromatic mono-, di- or poly-disulphimides which do not contain any reactive groups (optionally their alkali metal or alkaline earth metal salts) either before, during or after polycondensation.

This object is accomplished by an aromatic polyamide composition comprising an aromatic polyamide and a disulphimide of the formula:

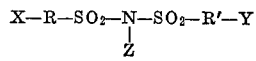

in which

R and R′, which may be the same or different, represent divalent aromatic radicals,
X represents hydrogen or a group of the formula $SO_3Z$ or $SO_2NH_2$,
Y represents hydrogen, a group of the formula:

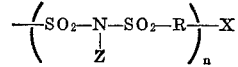

or a group of the formula:

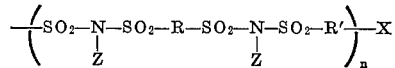

Z represents an alkali metal atom or an alkaline earth metal atom linked to a further disulphimide radical of the formula:

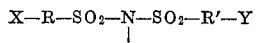

and
$n$ has a value from 0 to 50, said disulphimide being present in said composition in such an amount, that said composition contains 50 to 500 m. equ. of disulphimide groups per kg.

These aromatic polyamides having an affinity for basic dyes are obtained by incorporating a disulphimide having the general formula:

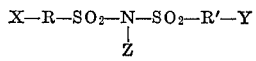

wherein X, Y, Z, R and R′ have the meanings given in claim 1, into an aromatic polyamide material selected from the group consisting of an aromatic polyamide and an aromatic polyamide-forming material, in such a quantity as to provide from 50 to 500 m. equ. of disulphimide units per kilogram of polyamide composition, said incorporating being effected, before, during or after polycondensation.

In the context of the invention, aromatic polyamides include both fully aromatic and also aromatic heterocycle-containing polyamides.

More particularly, the disulphimide which can be used in accordance with the invention can also be represented by the general formulae:

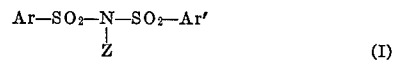 (I)

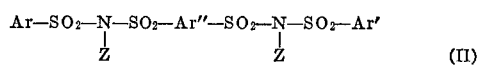 (II)

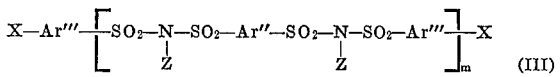 (III)

In these formulae:

Ar and Ar′, which can be the same or different, represent monovalent aromatic radicals which can optionally be substituted by inert groups, for example alkyl radicals or halogen atoms, carboxylic ester or alkoxy groups,
Ar" and Ar''', which can be the same or different, represent divalent aromatic radicals, for example 1,3-phenylene, 1,5-naphthalene, 2,6-naphthalene and the following divalent radicals:

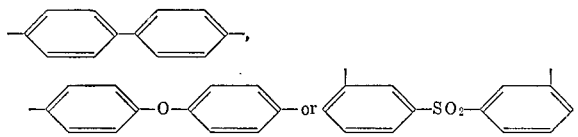

Z represents an alkali metal or alkaline earth metal,
X represents a group of the formula —SO$_3$Z or
—SO$_2$NH$_2$,
and
$m$ represents an integer from 1 to 50.

Production of the disulphimides which can be used in accordance with the invention is known from the literature, and is preferably carried out by condensing aromatic sulphonic acid chlorides with aromatic sulphonamides in an aqueous alkaline medium (Ber. 75, 532 (1942)). They can, however, also be produced by other processes, for example by reacting aromatic sulphonyl thionyl amines with aromatic sulphonic acids (German Patent Specification No. 1,235,300). In the production of the polymeric disulphimides (formula III), the average molecular weight, or $n$, can be varied within wide limits. The maximum average molecular weights of the polydisulphimides are obtained when a disulpho chloride and disulphonimide are condensed in a molar ratio of 1:1. This is not absolutely essential, however, because the lower molecular weight products obtained when other molar ratios are used can also be readily employed.

In the context of the present invention, polyamides include fully aromatic or aromatic heterocycle-containing polyamides which can be obtained by interfacial polycondensation, or preferably by condensation in solution, from aromatic or from aromatic heterocycle-containing diamines and dicarboxylic acid dihalides and which are described, for example, in U.S. Patent Specifications No. 3,094,511 and 3,376,268; in French Patent Specifications No. 1,199,458 and 1,430,480; in Belgian Patent Specifications No. 718,033, 718,034 and 742,311; and in German Offenlegungsschrift 1,946,789 and 1,953,358.

The manner of incorporation of the disulphimides is by no means critical and, in the case of condensation in solution, can be carried out at almost any time before, during or, preferably, after condensation. The mono-, di- or poly-disulphimides (optionally in the form of their alkali metal or alkaline earth metal salts) can be introduced in the form of solid substances, although they are preferably added in solution in the same polar organic solvent which was used for condensation, in order to guarantee complete admixture. Polyamides produced by interfacial polycondensation are dissolved in a polar organic solvent, preferably N-methyl pyrrolidone or dimethyl acetamide, optionally with the assistance of a solution promoter, for example an alkali metal or alkaline earth metal halide, and the resulting solution is thoroughly mixed before shaping with an alkali metal or alkaline earth metal salt of a mono-, di- or polydisulphimide.

To obtain a high degree of affinity for dyes, the disulphimide compound has to be incorporated in such a quantity that 1 kg. of polyamide compositions contains from 50 to 500 m. equ., preferably from 150 to 350 m. equ., of acid groups.

It is possible in this way to obtain polyamide compositions with a high affinity for basic dyes which can be readily processed into shaped articles such as filaments, fibres and films. These products show extremely favorable mechanical and thermal properties. For example, filaments obtained from these materials show considerably better tensile strength then filaments obtained from co-polyamides containing acid groups.

The following examples, in which the relative viscosities quoted were measured on a 0.5% solution of the particular polyamide in N-methyl pyrrolidone at a temperature of 20° C., are to further illustrate the invention without limiting it.

EXAMPLE 1

134 parts by weight of 3-(p-aminophenyl)-7-amino-2,4-(1H,3H)-quinazolindione were introduced into 707 parts by weight of absolute dimethyl acetamide, followed by the addition, in portions with continuous stirring at 5 to 10° C., of 101.5 parts by weight of isophthalic acid dichloride. The polyamide solution became so highly viscous that altogether another 200 parts by weight of dimethyl acetamide had to be gradually added in order to dilute the solution. To neutralise the hydrochloric acid formed, 58 parts by weight of propylene oxide were stirred in. This was followed by the addition of a solution of 13 parts by weight of bis-(p-tolyl)-disulphimide (m.p. 164 to 166° C.) in 100 parts by weight of dimethyl acetamide.

Filaments were spun from this polyamide solution which had a viscosity $\eta$=1535 poises at 20° C. ($\eta_{rel.}$= 1.9), through a 10-hole spinneret into an aqueous precipitation bath having a temperature of 20° C. The draw-off rate amounted to 10 m./min. After a two-stage stretching operation in boiling water in a ratio 1:1.5 and then on a heating bow at 230 to 290° C. in a ratio 1:1.3 to 1.4, filaments with a tensile strength of 4.7 to 5.3 g./dtex. were obtained. They had a breaking elongation of from 5 to 6%.

10 g. batches of fibres of this disulphimide-modified polyamide and of the unmodified condensate of 3-(p-amino - phenyl)-7-amino-2,4-(1H,3H) - quinazolindione and isophthalic acid dichloride were dyed with Astrazonrot RL (Colour Index I, p. 162) at 120° C. The dye bath was adjusted to pH 4.5 and left standing for 1.5 hours at 120° C.

In order precisely to determine the greater affinity for dyes, 500 mg. batches of the treated fibres were dissolved in 25 cc. of dimethyl acetamide and the extinction values were measured in a Photometer (BKF, a product of Messrs. Kipp und Zonen) at 475 m$\mu$ in comparison with pure dimethyl acetamide. In the case of the disulphimide-modified polyamide, the extinctions amounted to $E$=1.0 as against $E$=0.1 for the unmodified polyamide.

The 3-(p-aminophenyl)-7-amino-2,4-(1H,3H) - quinazolindione (m.p. above 360° C.) used for polycondensation was obtained by the catalytic reduction of the corresponding dinitro compound (m.p. 339 to 341° C.) which was in turn obtained by reacting 4-nitroanthranilic acid with p-nitrophenyl isocyanate.

EXAMPLE 2

750 parts by weight of 3-(p-aminophenyl)-7-amino-2,4-(1H,3H)-quinazolindione were condensed, as in Example 1, with 568 parts by weight of isophthalic acid dichloride in 4260 parts by weight of dimethyl acetamide. The polyamide solution became so highly viscous that another 1800 parts by weight of dimethyl acetamide had to be gradually added. The hydrochloric acid formed during condensation was neutralised by 325 parts by weight of propylene oxide. A solution of 72.8 parts by weight of bis-(p-tolyl)-disulphimide in dimethyl acetamide was then stirred in.

Filaments were dry-spun from this polyamide solution which had a viscosity $\eta$=1620 poises at 20° C. ($\eta_{rel.}$= 1.91) through a 72-hole spinneret. The shaft temperature was 215° C. and the draw-off rate was 100 m./min. Filaments with a strength of 3.6 to 4 g./dtex. at 7 to 8% elongation were obtained.

Comparative dyeing tests were also carried out with these polyamide filaments as described in Example 1. A solution of the filaments, dyed with the same dye as in Example 1, in dimethyl acetamide had an extinction of $E$=1.75 (as against $E$=0.1 for a solution of the unmodified polycondensate).

EXAMPLE 3

A neutral polyamide solution was prepared as described in Example 1 by condensing 134 parts by weight of 3-(p-aminophenyl)-7-amino-2,4-quinazolindione with 101.5 parts by weight of isophthalic acid dichloride in dimethyl acetamide. A solution of 22 parts by weight of dinaphthyl-(1)-disulphimide (m.p. 215 to 218° C.) in dimethyl acetamide was then stirred into this neutral polyamide solution.

Filaments with a tensile strength of 4.0 to 4.5 g./dtex. at 3 to 4% elongation were wet-spun from this polyamide solution ($\eta=820$ poises at 20° C., $\eta_{rel.}=1.6$) as in Example 1.

Comparative dyeing was carried out by the method described in Example 1. A solution of 500 mg. of the fibres dyed with Astrazonrot RL in dimethyl acetamide had an extinction of $E=1.25$ as against $E=0.1$ for a solution of the unmodified polyamide.

EXAMPLE 4

Instead of dinaphthyl-1-disulphimide as in Example 3, a solution of 23.1 parts by weight of 1,3-di-(naphthyl-(1)-disulphimido)-benzene (m.p. 269 to 271° C.) in 80 parts by weight of dimethyl acetamide was stirred into a neutral polyamide solution of the same kind.

Filaments with a strength of 4.6 to 5.1 g./dtex. at 3 to 5% elongation were wet-spun from this polyamide solution ($\eta=1600$ poises at 20° C., $\eta_{rel.}=1.88$).

Comparative dyeing with Astrazonrot RL, carried out as in Example 1, produced an extinction of $E=1.5$ for a solution of 500 mg. of the dyed fibres in 25 ml. of dimethyl acetamide.

EXAMPLE 5

Instead of di-naphthyl-(1)-disulphimide as in Example 3, a solution of 11 parts by weight of a polydisulphimide having the formula:

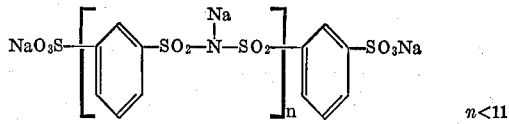

in 50 parts by weight of dimethyl acetamide was stirred into a polyamide solution of the same kind. The polydisulphimide (m.p. above 360° C.) was obtanied by condensing m-phenylene disulphochloride with m-phenylene disulphonamide in a molar ratio of 6:5 in an alkaline aqueous medium.

Filaments with a strength of 3.9 to 4.4 g./dtex. at 4% elongation were wet-spun from the polyamide solution which had a viscosity of 1150 poises ($\eta_{rel.}=1.88$) and a solids content of 18.5%.

Comparative dyeing with Astrazonrot RL carried out as in Example 1 produced an extinction of $E=0.8$ for a solution of 500 mg. of the dyed fibres in 25 ml. of dimethyl acetamide.

EXAMPLE 6

If the diamine used in Example 1 is replaced by 179 parts by weight of 2-[3'-(p-aminophenoxy)-phenyl]-3-methyl-6-amino-4(3H)-quinazolone (m.p. 276 to 279° C.) condensed with 101.5 parts by weight of terephthalic acid dichloride, with the procedure otherwise the same, a highly viscous polyamide solution is obtained which was stirred thoroughly into 24.4 parts by weight of di-(p-chlorophenyl)-disulphimide.

Filaments with tensile strengths of from 5.8 to 6.5 g./dtex. for an elongation of 4 to 5% were wet-spun from this polyamide solution ($\eta_{rel.}=2.35$).

Comparative dyeing was also carried out with these polyamide filaments by the method described in Example 1. A solution of 500 mg. of the filaments dyed with Astrazonrot RL in 25 cc. of dimethyl acetamide had an extinction of $E=1.75$ (as against $E=0.15$ for a corresponding solution of the unmodified quinazolone polyamide).

The 2-[3'-(p-aminophenoxy)-phenyl]-3-methyl-6-amino-4(3H)-quinazolone (m.p. 276 to 279° C.) used for poly-condensation was obtained by reacting 5-nitroanthranilic acid and N-methyl-3-(p-nitrophenoxy)-benzimide chloride to form 2-[3'(p-nitrophenoxy)-phenyl]-3-methyl-6-nitro-4(3H)-quinazolone (m.p. 248 to 249° C.) which was hydrogenated.

EXAMPLE 7

If the diamine used in Example 1 is replaced by 210 parts by weight of 2-[3'-(p-aminophenoxy)-phenyl]-3-phenyl-7-amino-4(3H)-quinazolone (m.p. 253 to 256° C.) condensed with 101.5 parts by weight of terephthalic acid dichloride, with the procedure otherwise the same, a highly viscous polyamide solution is again obtained into which a solution of 25 parts by weight of 1,5-di-(naphthyl-(1)-disulphimido)-naphthalene in 100 parts by weight of dimethyl acetamide was stirred.

Filaments with a tensile strength of from 4 to 4.5 g./dtex. were wet-spun from this polyamide solution ($\eta_{rel.}=2.25$).

Comparative dyeing was carried out with these polyamide filaments by the method described in Example 1. A solution of 500 mg. of the filaments dyed with Astrazonrot RL in 25 cc. of dimethyl acetamide had an extinction of $E=2.05$ (as against $E=0.15$ for a corresponding solution of the unmodified quinazolone polyamide).

The 2-[3'(p-aminophenoxy)-phenyl]-3-phenyl-7-amino-4(3H)-quinazolone (m.p. 253 to 256° C.) was obtained by reacting 4-nitroanthranilic acid and N-phenyl-3-(p-nitro-phenoxy)-benzimide chloride to form 2-[3'(p-nitrophenoxy) - phenyl] - 3-phenyl-7-nitro-4(3H)-quinazolone (m.p. 138 to 241° C.) which was hydrogenated.

EXAMPLE 8

If the diamine used in Example 1 is replaced by 348 parts by weight of a diamine having the formula:

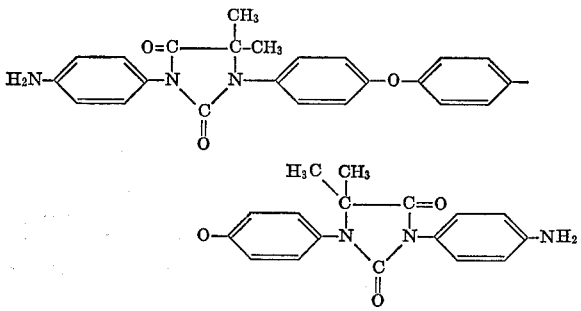

(m.p. 300 to 303° C.) condensed with 101.5 parts by weight of terephthalic acid dichloride, with the procedure otherwise the same, a highly viscous polyamide solution is again obtained into which a solution of 35 parts by weight of 1,5-di-(naphthyl-(1)-disulphimido)-naphthalene in 100 parts by weight of dimethyl acetamide was stirred.

Filaments which, after stretching, had a tensile strength of 3 to 3.5 g./dtex. were wet-spun from this solution.

Comparative dyeing was carried out with these polyamide filaments by the method in Example 1. A solution of 500 mg. of the filaments dyed with Astrazonrot RL in 25 cc. of dimethyl acetamide had an extinction of $E=1.65$ as against $E=0.15$ for corresponding solution of the unmodified hydantoin polyamide.

The diamine used for polycondensation (m.p. 300 to 303° C.) was obtained by reacting p-nitrophenyl isocyanate with 1,4-di-(p-cyanoisopropylamino)-phenoxy benzene in a molar ratio of 2:1, followed by ring closure to form the dihydantoin derivative (m.p. 277 to 285° C.) which was catalytically reduced.

EXAMPLE 9

2030 parts by weight of terephthalic acid dichloride were introduced in portions with continuous stirring at 20° C. into 2345 parts by weight of 2-chloro-4,4'-diaminodiphenyl-ether dissolved in 13,000 parts by weight of absolute dimethyl acetamide. The polyamide solution became highly viscous and had to be diluted with another 2000 parts by weight of dimethyl acetamide. To neutralize the hydrochloride acid formed, 1160 parts by weight of propylene oxide were stirred in. This was followed by the addition of a solution of 13 parts by weight of bis-(p-tolyl)-disulphimide in 2000 parts by weight of dimethyl acetamide.

Filaments were spun from this polyamide solution which had a viscosity $\eta=1340$ poises at 20° C. ($\eta_{rel.}=1.73$) through a 72-hole spinneret by a dry spinning process. The temperature in the spinning tower was 220° C. The draw-off rate amounted to 120 m./min. Filaments with a tensile strength of 6 to 7 g./dtex. at an elongation of 10 to 12% were obtained.

10 g. batches of fibers of this disulphimide-modified polyamide and of the unmodified condensate of 2-chloro-4,4'-diamino-diphenyl-ether and terephthalic acid dichloride were dyed with Astrazonrot RL (Color Index I, p. 162) at 120° C. The dye bath was adjusted to pH 4.5 and left standing for 1.5 hours at 120° C.

In order precisely to determine the greater affinity for dyes, 500 mg. batches of the treated fibers were dissolved in 25 cc. of dimethyl acetamide and the extinction values were measured in a Photometer (BKF, a product of Messrs. Kipp and Zonen) at 475 m$\mu$ in comparison with pure dimethyl acetamide. In the case of the disulphimide-modified polyamide, the extinctions amounted to $E=1.65$ as against $E=0.1$ for the unmodified polyamide.

EXAMPLE 10

203 parts by weight of terephthalic acid dichloride were introduced in portions with continuous stirring at 20° C. into 234.5 parts by weight of 2-chloro-4,4'-diamino-diphenyl-ether dissolved in dimethyl acetamide. Following the procedure of Example 9, a neutral polyamide solution was obtained. This was followed by the addition of 29 parts by weight of dinaphthyl-(1)-disulfimide dissolved in dimethylacetamide.

Filaments were spun from this polyamide solution which had a viscosity $\eta=1050$ poises at 20° C. ($\eta_{rel.}=1.69$) through a 10-hole spinneret into an aqueous precipitation bath having a temperature of 20° C. The draw-off rate amounted to 10 m./min. After a two-stage stretching operation in boiling water in a ratio of 1:2 and then on heating bow at 330 to 360° C. in a ratio of 1:1.5 to 1.6 filaments with a tensile strength of 5.5 to 6.5 g./dtex. were obtained. They had a breaking elongation of from 9 to 10%.

Comparative dyeing tests were also carried out with these polyamide filaments as described in Example 9. The solution of 500 mg. batches of the treated fibers were dyed with the same dye as in Example 9. In the case of the disulphimide-modified polyamide the extinction amounted to $E=1.35$ as against $E=0.1$ for the unmodified polyamide.

EXAMPLE 11

Following the procedure of Example 10, 227 parts by weight of 4,3-diaminobenzanilide were condensed with 203 parts by weight of isophthalic acid dichloride, and thereafter, 26 parts by weight of di-(p-chlorophenyl)-disulphimide were introduced with stirring into the highly viscous polyamide solution.

Filaments with a tensile strength of 4.8 to 5.5 g./dtex. at an elongation of 8 to 11% were wet spun from the polyamide solution which had a viscosity of $\eta_{rel.}=1.65$.

Comparative dyeing tests were carried out with these polyamide filaments as described in Example 9. A solution of the filaments dyed with the same dyes as in Example 9 in dimethyl acetamide had an extinction of $E=1.25$ as against $E=0.15$ for a solution of the unmodified polyamide.

What we claim is:

1. A fiber forming polyamide composition consisting essentially of
    (1) an aromatic carboxylic polyamide; and
    (2) 50 to 500 milliequivalents per kilogram of said composition of a disulphimide having the formula $$X-Ar-SO_2-N-SO_2-Ar'-X$$
$$\phantom{X-Ar-SO_2-N}|\phantom{SO_2-Ar'-X}$$
$$\phantom{X-Ar-SO_2-}Z$$

or $$X-Ar-SO_2-N-SO_2-Ar''-SO_2-N-SO_2-Ar'-X$$
$$\phantom{X-Ar-SO_2-N}|\phantom{SO_2-Ar''-SO_2-N}|\phantom{SO_2-Ar'-X}$$
$$\phantom{X-Ar-SO_2-}Z\phantom{-SO_2-Ar''-SO_2-}Z$$

wherein
   X is hydrogen or —$SO_3Z$;
   Ar, Ar', and Ar" are carbocyclic aromatic radicals; and
   Z is hydrogen or alkali metal.

2. The fiber forming polyamide composition of Claim 1 wherein said polyamide is the condensation product of 2-chloro-4,4'-diaminodiphenyl ether and terephthalic acid dichloride and said disulphimide is bis-(p-tolyl)-disulphimide.

3. The fiber forming polyamide composition of Claim 1 wherein said polyamide is the condensation product of 2-chloro-4,4'-diaminodiphenyl ether and terephthalic acid dichloride and said disulphimide is dinaphthyl-(1)-disulphimide.

4. The fiber forming polyamide composition of Claim 1 wherein said polyamide is the condensation product of 4,3-diaminobenzanilide and isophthalic acid dichloride and said disulfimide is di-(p)-chlorophenyl-disulphimide.

5. A filament, fiber, or film consisting essentially of the composition as claimed in Claim 1.

6. A fiber consisting essentially of the polyamide composition as claimed in Claim 1.

References Cited

UNITED STATES PATENTS

| | | | |
|---|---|---|---|
| 2,473,924 | 6/1949 | Walker | 260—78 S |
| 3,235,533 | 2/1966 | Brinkman | 260—78 R |
| 3,661,504 | 5/1972 | Stackman et al. | 260—78 S |
| 3,287,324 | 11/1966 | Sweeny | 260—78 R |
| 3,330,811 | 7/1967 | Craven | 260—78 R |
| 3,354,120 | 11/1967 | Bach et al. | 260—78 R |
| 3,467,623 | 9/1969 | Hinderer et al. | 260—78 R |
| 3,755,263 | 8/1973 | Bodescheim et al. | 260—78 R |

HAROLD D. ANDERSON, Primary Examiner

U.S. Cl. X.R.

8—178 R; 260—78 R, 78 S